United States Patent Office 3,164,554
Patented Jan. 5, 1965

3,164,554
SOLS OF ACTINIDE METAL OXIDES
Wayne T. Barrett, Severna Park, Moises G. Sanchez, Glen Burnie, and Milton C. Vanik, Brookeville, Md., assignors to W. R. Grace & Co., New York, N.Y., a corporation of Connecticut
No Drawing. Filed May 2, 1960, Ser. No. 25,847
5 Claims. (Cl. 252—301.1)

This invention relates to stable hydrous oxide sols and the methods of preparing them.

In one specific aspect it relates to the preparation of thoria, urania and plutonia sols suitable for use in aqueous homogeneous reactors. This application is a continuation-in-part of our prior application SN. 693,511, filed October 31, 1957, now U.S. Patent No. 3,097,175.

Aqueous homogeneous reactors may be one of three types: Burner reactors, converter reactors or breeder reactors. Burner reactors are those in which fissionable materials are consumed as fuels but virtually no fuel is generated. Converter reactors are those which produce a different fissionable fuel than is destroyed in the fission process. Breeder reactors are those which produce more of the same type of fissionable fuel as is being consumed in the reactor. A converter reactor becomes a breeder reactor if there is a net gain in the production of fissionable fuel and this fuel is subsequently burned in the reactor.

The nuclear reactions involved in the breeder reactor using a mixed thoria-urania fuel are typical and are well known. In a two region reactor, for example, a core of uranium solution is surrounded by a blanket of thorium 232. As the uranium in the core fissions, it gives off neutrons, some of which are absorbed by the thorium 232 to convert it to thorium 233. Thorium 233 decays with a half life of 23.3 minutes to yield protactinium 233 which in turn decays to uranium 233. The uranium 233 is fissionable uranium isotope and itself a suitable fuel. These breeder reactors may also be designed as single region reactors which contain a homogeneous mixture of fissionable and fertile material in a moderator. These reactors differ from the single region reactor in that they have larger reactor diameters in order to minimize neutron losses. They normally contain the fuel plus fertile material in concentrations as high as 300 grams per liter.

Aqueous homogeneous reactors have several advantages over the conventional type of reactors used in nuclear power development. These advantages stem partly from the fluid nature of the fuels and partly from the homogeneous mixture in the moderator. The most obvious advantage of these systems resides in the high power density; that is, because of the homogeneous nature of the reactor fuel fluid, there is essentially no heat transfer barrier between the fuel and the coolant. These reactors also compare favorably with heterogeneous reactors in that the high burn-up of fuel is possible. Because the fuel is liquid, continuous removal of poisons that cause radiation damage to fuel elements is possible and new fuel can be continually added to the system thereby permitting unlimited burn-up. Neutron economy in the liquid fuel system is improved by eliminating the absorption of neutrons by the cladding and the structural materials which are present in the reactor core of the heterogeneous reactors. The design of these reactors makes possible rapid removal of fission product poisons.

In some of the reactor systems of the prior art, uranyl sulfate in aqueous solution is used as the fuel in aqueous homogeneous reactors. These solutions have not been particularly satisfactory as neutron sources because they are corrosive at temperatures of 250 to 300° C. and at these temperatures have been found to be unstable.

It has been recognized that these problems can be solved by using plutonia sols, urania sols, thoria sols or thoria-urania sols as fuels in aqueous homogeneous reactors of the type set out above. Sols have the advantage of being homogeneous fluids and have been found to avoid the disadvantages that are present when plutonia, urania, thoria or thoria-urania slurries are used. There is, for example, no need to furnish agitation to prevent solids separation. Because of their small size, these particles are not subject to attrition and the problem of erosion of equipment becomes unimportant. Sols have relatively low viscosities and thus can be easily pumped.

In order to obtain the final thoria, urania or plutonia sol of the necessary hydrothermal stability and low viscosities, it is necessary that the thoria, urania or plutonia particles be spheroidal or substantially so. In addition, the particles suitable for use in production of the stabilized sols of the present invention should be of uniform size of more than about 30 millimicrons weight median diameter, but still exhibiting colloidal properties. Suitable thoria, urania or plutonia sols can be prepared by continuously removing anions from a dilute salt solution while maintaining the system at an elevated temperature. Preferred techniques suitable for anion removal are: (1) Electrodialysis using anion permeable membranes, (2) dialysis using an anion permeable membrane, (3) ion exchange using resin in the hydroxide form, (4) decomposition of the salt of volatile acid, and (5) electrolysis of a thorium, uranium or plutonium salt, the anion of which is oxidized to a volatile compound or state.

In the present process we start with an aqueous solution of any thorium, uranium or plutonium salt of a strong monobasic acid, preferably with a salt which is sufficiently soluble that a 5 to 10% $ThO_2$, $UO_2$ or $PuO_2$ solution can be formed. The polybasic salts are not used because their multi-valent anions adversely affect stability of the sol during formation. The nitrates, chlorides or perchlorates of these elements are suitable for this purpose. The choice of the salt to be used in the process of preparing these sols depends on the metal ion to be used, thus in plutonium where the plus IV sols would be the most desirable, the chloride would be used. The disadvantage of the chloride is that it is corrosive at elevated temperatures and the chloride ions must be removed to a low ionic concentration after the sol is prepared. The thorium nitrate is a stable plus IV nitrate and is the most desirable starting salt.

Thoria, urania and plutonia sols prepared by any of the foregoing techniques are characterized by relatively dense, generally spherical particles having colloidal dimensions and exhibiting no tendency to agglomerate at ambient temperatures.

The methods of preparing thoria dispersion by peptizing thorium oxide hydrogels are well known. Such dispersions have been characterized by undesirably high viscosities and they are not rendered hydrothermally stable by any heretofore known method. These undesirable characteristics arise from the irregular shapes of the particles making up the dispersion as well as their high degree of hydration.

We have discovered that generally spherical, colloidal densified thoria, urania or plutonia particles prepared by the methods described above can be coated with a protective layer such as silica, zirconia, titania, etc. The cladding with silica gives a product that has some advantages over the zirconia coated product. Certain hereinafter defined precautions must be taken to avoid gelation of the thoria, urania or plutonia sol during the coating of the sol with silica.

We have discovered that the parent thoria, urania or plutonia sols as well as cladded silica sols should be relatively dilute in order to establish proper mixing. For example, it is preferred to use a parent thoria sol at a solids content of about 10%. In like manner, it is preferred to use a silica sol at a concentration of about 1 to 2% silica.

In order that accretion of the silica particles to thoria particles occurs rapidly and completely, it is necessary that the silica particles be in an active state as is characterized by freshly prepared sols. In addition, the silica sol to be used in forming the coating should be relatively free of large micelles. Sols which have been stabilized as by heat treating or aging do not accrete to the thoria particles and thus are not suitable for the present purposes. Accordingly, it can be said that the silica sol should be active or freshly prepared and that it should have been prepared under conditions which yield a micelle size of less than 5 millimicrons.

Useful sols of silica may be prepared by deionizing sodium silicate by passing it through a cation exchange resin. Ion exchange is the preferred method since it yields a sol substantially free of electrolytes. This method is described fully in U.S. Patent No. 2,244,325. It is preferred that both thoria and silica sols be substantially free of electrolytes at the time they are brought together, otherwise gelation may occur. A silica sol prepared by ion exchange contains virtually no sodium and is very reactive. Sols of about 2% silica (the concentration which gives the best results) can be readily prepared by ion exchange.

The particles may be coated with zirconia using the same or a substantially different technique. In this method, a thoria, urania or plutonia sol is deionized and zirconyl nitrate in a dilute solution is added to the heated sol dropwise with vigorous stirring. The sol is concentrated and then passed through an ion exchange resin to remove the electrolytes. Inasmuch as the resin will not remove the zirconia and because of the stability of the zirconia-coated sol, it is obvious that the zirconia particles are present as a coating on the thoria, urania or plutonia sol particles.

Electrophoresis tests reveal that the sol particles in the parent sol, such as a thoria sol, carry a positive charge, whereas the silica particles carry a negative charge. This measurement is made in accordance with the method described in Physical Methods of Organic Chemistry, Part II, Second Edition, by A. Weissberger, p. 1685. The apparatus comprises a Tiselius cell in a Schlieren optical system.

One of the problems involved in the silica cladding is that the silica may tend to gel or precipitate at the isoelectric point. Thus, if thoria and solica sols are mixed together in amounts sufficient only to neutralize a charge on the respective particles, a gelation may result or the particles may precipitate at the isoelectric point. We have discovered that precipitation or gelation does not occur if the mixing is carried out under such conditions that the charge on the thoria particles is changed quickly from positive to negative and the mixture is not allowed to stand for any appreciable time at the isoelectric point. Thus, it is necessary that the silica sol be added to the parent thoria sol rapidly and with thorough so that the particles or micelles of thoria and silica are brought to the negative side substantially instantaneously.

In this way gelation can be avoided. In order to insure complete and rapid mixing of silica and thoria particles, the sol should be relatively dilute when mixed. Once the thoria has been coated with siilca particles and the coated micelles exhibit a negative charge, the danger of gelation is not so great. This mixed sol exhibits some of the properties of silica sols and since both starting sols are acidic, the mixed sol is also acidic. Like acidic silica sol, it is not stable for long periods. At an acid pH it may be gelled by the addition of electrolytes or by heating to concentrate. We have found that the mixed sol can be stabilized by the addition of sufficient alkali metal hydroxides to raise the pH of the solution to a value of between 7 and 11, the preferred pH being about 7.5 to 9.0. This should be done soon after mixing. At about pH 11, the silica begins to be redissolved. Therefore, it is desirable to add just enough alkali to insure stability of the final sol but not enough to dissolve the silica.

The amount of silica used in cladding the thoria, urania or plutonia particles must be sufficient to convert the charge on the thoria, urania or plutonia particles from positive to negative. The weight ratio of thoria, urania or plutonia to silica or zirconia, titania, etc. cannot be stated with mathematical exactness since the amount of silica required to coat the thoria particles is dependent on the amount of surface and not on the weight of the thoria. Obviously if the thoria is relatively dense, the weight ratio of silica to thoria will be lower than if the thoria particles are less dense. In general, the thoria to silica weight ratio will be in the range of 1:1 to 10:1 and preferably between 2:1 and 3:1. In coating with zirconia, titania, etc. the zirconia, titania, etc. is added as a nitrate solution of the metal. This solution must of necessity be dilute and preferably about 1.5% to 2% as the metal nitrate solution. The amount of this solution to be added depends on the amount of surface and not the weight of the thoria, urania or plutonia. In general, the thoria, urania or plutonia to cladding metal oxide weight ratio would be in the range of about 1:1 to 20:1, preferably between 2:1 and 10:1. In silica coating, the thoria to silica ratio should be as high as possible since neutron capture is a nuclear process depending on atomic considerations and silicon is a relatively light element. Even at rate ratios as low as 1:1, the presence of the silicon does not reduce the efficiency too much because its thermal neutron capture cross-section is 0.13 barns as compared to 7 for thoria. Thus, at a thoria to silica ratio of 1:1 (corresponding to an atomic ratio of 0.227:1), the silica will capture only about 8% of the neutrons and the thorium will capture 92%. At a 3:1 ratio, the silica will capture only about 2.7%. The anion content of the sol at this stage is usually in the range of 0.1 to 1 weight percent.

If the anion content of the mixed sol is undesirably high, further purification is carried out. This can best be done by heating the alkaline sol under non-evaporative conditions under total reflux or in an autoclave to insure release of anions from within the micelles. This solution can then be cooled and contacted with a deionizer to remove electrolytes. After alkaline metal ions are removed, the alkalinity must be restored by adding an alkali metal hydroxide. The resulting pH should be about 7 to 11 as stated above. Except for the stabilizing alkali metal cations, the resulting solution is substantially electrolyte free.

During heating of the sols as described above, the silica, zirconia, titania, etc. particles become closely associated with the thoria, urania or plutonia micelles. In electron micrographs of the autoclaved silica-coated thoia sols, for example, no evidence of free silica particles were seen. In electron micrographs of these autoclaved sols, the micelles appear as large dense opaque cores of thoria having a less opaque shell of silica. The sols at this stage are stable indefinitely at temperatures up to 300° C. These sols are well suited for nuclear reactor uses.

A sol prepared as described can be concentrated by evaporation to a total solids content of about 60%. The finished sol may be diluted to any lower solids content by the addition of deionized water or water of low ionic content.

Since sols of this type tend to coagulate or gel on the addition of electrolytes, care must be taken that the electrolyte content be maintained at a minimum. A convenient method of measuring concentration of the undesired materials is specific conductance. For the sols of the present invention, specific conductance will usually range between $10^{-5}$ and $10^{-2}$ mhos/cm. The stability of any given sol is improved by a reduction in the ionic content. Therefore, conductances in the lower part of this range are preferred.

Our preferred hydrothermally stable sols have a specific conductance of less than that of a pure alkali metal hydroxide solution of the same alkali concentration. Specific conductance is measured at 25° C. and one kilocycle using a standard conductivity bridge with a cell inserted in one arm. The cell constant is determined using KCl solutions of 0.01 normality (the conductance of which is ascertained from the conductivity tables) and using the equation $$K = L_{KCl} lR$$

where $K$ = cell constant and cm.$^{-1}$
$R$ = bridge resistance in ohms
$L$ = specific conductance in mhos of the standard KCl solution The conductance L of the sol in question can be determined by measuring its resistance in the same cell and using the equation $$L \text{ sol} = \frac{K}{R}$$

where $K$ = cell constant
$R$ = resistance in ohms

Low viscosity is in general associated with stability. A low viscosity is desirable in the present invention inasmuch as these stable sols are intended for use in preparing fuels to be used in nuclear reactor systems.

The thorium content of our sols was determined by fluorescent X-rays spectroscopy and by standard gravimetric techniques. Electron micrographs were made using the standard techniques.

In the present disclosure, we have referred to the use of alkali metal hydroxides and specifically to sodium hydroxide, although other preparations may be used. The only limitations in the selection of the base resides in the fact that the base should be composed of low thermal neutron cross-section elements and be stable under reactor conditions.

The present invention will be further explained by the following illustrative but non-limiting examples.

EXAMPLE I 4000 grams of a solution of thorium nitrate in deionized water containing 10% by weight equivalent thorium oxide was charged into a heated densification vessel for use in the preparation of a thoria sol. This solution was circulated at a rate of approximately 150 cc./min. through the cathode compartment of a cell divided by an ion exchange membrane of Amberplex A1. The electrode compartments each had a capacity of approximately 150 ml. and each was equipped with a stirrer. Platinum electrodes were positioned on each side of the membrane a distance of about 1/8″ from the membrane.

The temperature in the densification vessel was maintained at 92–97° C. Thorium nitrate solution was withdrawn from the vessel at the rate of about 150 cc./min. through a cooled heat exchanger and pumped into the above described cell. The temperature of the incoming solution was controlled to maintain a cell temperature of about 25–32° C. The solution leaving the cell was passed into a heat exchanger where it was heated to 92–97° C. and then returned to a densification vessel. Evaporation losses were minimized by equipping the cell with a condenser and by periodically adding deionized water to take care of unavoidable losses.

Circulation of the solution was continued over a total period of 29 hours and 10 minutes with overnight interruptions during which period the temperature was maintained at 70° C. During electrolysis, the amperage dropped from about 10 to a value of 1.5 and the pH rose from a value of about 2 to about 6.7. The sol had a density of 1.074 g./cc., viscosity of 1.00, conductivity of $9.63 \times 10^{-4}$ mhos/cm. and contained 8.05 weight percent thoria. The drop in $ThO_2$ concentration for the finished sol over the initial solution was brought about by the addition of excess water in compensating for evaporation losses. Electron micrographs, shadowed and unshadowed, revealed spherical, well-defined particles having a weight median diameter of 55 millimicrons. Electrophoresis studies revealed that the sol was positively charged. Sedimentation studies with the ultracentrifuge gave three sedimentation constants at 20° C.:

$$1.65 \times 10^{-9}, \ 0.38 \times 10^{-9}, \ \text{and} \ 0.21 \times 10^{-9}$$

seconds. Using the sedimentation constants, Stokes Equation for centrifugal fields, and the electron micrograph distribution count data, the micelle density was estimated to be $7 \pm 1$ g./ml.

This example illustrates a process for the preparation of the thoria sols of our invention.

EXAMPLE II

The thoria sols prepared in accordance with the procedure set out in Example I were clad with silica. For simplicity in the present disclosure, these thoria sols are referred to as "parent sols," after the addition of silica as "daughter sols" and after autoclaving as "grand-daughter sols."

Several liters of silica sol were prepared by passing a nominal 2% $SiO_2$ sodium silicate solution through an acid-regenerated ion exchange resin. The final sol contained 1.99% $SiO_2$, no soda, and had a pH of 3.30. Two liters of this freshly prepared silica sol were mixed rapidly and with vigorous agitation into two liters of the thoria sol described above, which had been further deionized by passing it through an anion exchange resin. After this, an additional two liters of the silica sol were added somewhat more slowly to yield a final sol having a pH of about 3.5. 412 cc. of 1.0 N sodium hydroxide were added to bring the pH of the mixed sol to 10.0 and the entire system was refluxed at 100° C. for 24 hours, at which time the pH was 9.95. The refluxed sol was then passed through a mixed cation-anion deionizing resin, which gave a product sol having a pH of 3.66. 50 cc. of 1.0 N sodium hydroxide were added to the mixed sols to raise the pH to 8.0 The dilute sol was used to prepare three samples of concentrated sols containing 38.4%, 41.4% and 46.7% solids by evaporation of water. These sols were then autoclaved at 250° C. for various periods of time in order to determine their hydrothermal stability. Results of these tests together with some of the physical characteristics of the sols are given in Table I.

Table I

| Designation | S25 | S30 | S31 |
|---|---|---|---|
| Percent Solids | 38.4 | 41.4 | 46.7 |
| Percent ThO₂ (by x-ray spectroscopy) | 26.2 | 26.4 | 31.7 |
| Density at 25° C. (g./ml.) | 1.445 | 1.494 | 1.583 |
| pH | 8.98 | 8.98 | 8.99 |
| Viscosity prior to autoclaving | 1.71 | 1.76 | 2.08 |
| Viscosity after autoclaving 18 hrs. at 250° C. | 1.10 | | |
| Specific conductivity (mhos/cm.×10⁻⁴) | 8.83 | 9.62 | |
| Hydrothermal stability at 250° C. Stable for at least. | 673 hrs. | 608 hrs.[1] | 593 hrs. |

[1] Sol S30 was tested at 300° C. and found to be stable for at least 63 hours.

EXAMPLE III

To demonstrate the effect of size of the thoria particles on stability, three cladded sols were prepared from three parent thoria sols of different particle size. These parent sols were prepared by electrodialyzing thorium nitrate solutions of nominally 5 and 10% thoria at predetermined elevated temperatures, the higher temperatures being used to give larger particle sizes.

The sols were cladded by mixing with the relatively dilute thoria sols a predetermined quantity of a freshly prepared (by ion exchange) silica sol at a concentration of about 2% silica. The silica sol in dilute form had a pH of 3.0 while the thoria sols had pH's of 6.5, 6.7, and 4.4.

In each case the pH of the mixed sol was adjusted to 10.0 by adding sufficient 1 N NaOH, after which the sols were boiled, deionized, adjusted to pH 8 with 1 N NaOH and concentrated.

The stability of these sols was tested by autoclaving them at 250° C. for 63 hours, at the end of which time they were cooled and visually examined for evidence of gelation. The one indicated to be questionable as to stability showed evidence of gelation. The one characterized as "stable" contained a few small lumps, which were redispersed by mild agitation. The one characterized as "very stable" exhibited no evidence of gelation and had a viscosity of 1.21. The following table shows, for each thoria sol, the particle size, composition and stability. The two "stable" sols were heated further for more than 200 hours with no signs of instability.

Table II

| Parent Weight Median Diameter | Percent Solids ±0.5% | Percent ThO² ±1% | ThO₂ to SiO₂ Wt. Ratio | Stability |
|---|---|---|---|---|
| 50 mμ | 29 | 20 | 2.2/1 | Questionable. |
| 55 mμ | 47 | 32 | 2.1/1 | Stable. |
| 77 mμ | 45 | 31 | 2.2/1 | Very Stable. |

On the basis of these tests, it is seen that within the colloidal size range the weight median diameter should be above 50 mμ to insure the desired thermal stability in the concentrated sol. The particle sizes were determined by direct measurement from electron micrographs of known magnification.

EXAMPLE IV

The poor hydrothermal stability of untreated thoria sols is demonstrated by the following example.

A thoria sol of the parent type containing 30.2% ThO₂, having a pH of 4.88 and a relative viscosity of 1.12 was heated overnight in a Vycor tube. At some time during the 19 hour heating period, the sol lost its fluidity and turned into a hydrogel. Direct observation of the tube was made the following morning. No viscosity measurements were made since the sample would not flow.

Another thoria sol sample, also of the parent type, but containing only 6.47% ThO₂ was heated overnight at 250° in a Vycor tube. After 21 hours the autoclave was opened and the sample examined. The solids in the sample had at some point during the treatment separated and had settled to the bottom of the tube. The supernatant liquid showed no turbidity.

EXAMPLE V

Other cladding agents for thoria sols prepared in accordance with the process of this invention include zirconia, titania and other similar materials.

The effectiveness of the zirconia coating on these particles was demonstrated in a run in which a thoria sol containing 4.7% ThO₂, 0.21% NO₃⁻ ion, 0.002% Na₂O and having a pH of 4.8 was coated with zirconia. In this run a total of 200 ml. of this material consisting of dense, well-defined particles in the 15–35 millimicron range were placed in a vessel and heated to 80° C. A charge of 200 ml. of a 0.5% zirconyl nitrate solution was added dropwise with vigorous stirring to the thoria sol at 80° C. over a period of 2 hours. After the addition was complete, the entire system was concentrated to 145 ml. This concentrated sol was passed through a mixed bed of ion exchange resins.

The thermal stability of the zirconia-clad thoria sol was demonstrated by heating the cladded sol in a Vycor tube at a temperature of 150° C. for 8 hours and at 150° C. for 72 hours. The parent thoria sol was treated in a similar manner. The relative stability of the zirconia-clad sol and the unclad thoria sol is shown in Table III below.

Table III

| Composition | After 8 hrs. at 150° C. | After 72 hrs. at 150° C. | Room temp. stability after several months |
|---|---|---|---|
| 4.6% ThO₂ | Separation of solids, thick viscosity. | Separation of solids, relative viscosity>10. | Separation of solids, clear supernatant after shaking, relative viscosity=7.9. |
| 5.7% ThO₂, .27% ZrO₂ | No separation, water-like viscosity. | No separation relative viscosity=1.13. | No separation, relative viscosity=1.13. |
| 5.7% ThO₂, .53% ZrO₂ | do | No separation, relative viscosity=1.14. | Do. |

Although the zirconia sol coating is possibly not as desirable as the silica coating as far as imparting hydrothermal stability is concerned, these data indicate that definite improvement in hydrothermal stability results from the cladding of the thoria sol with zirconia.

EXAMPLE VI

The effect of higher densification temperature on particle size was studied in a run in which the temperature in the densification vessel was increased to 110° C.

In this run a total of 3750 grams of a 5% thoria solution was charged to the heated densification vessel. The run was completed using the technique and conditions set out in detail in Example I except that the temperature in the densification vessel was maintained at 110° C. and the pressure at 10 p.s.i.g. during the period of the run. A comparison of the particle size range obtained in this run with the particle size range obtained when the run was carried out at 92 to 97° C. is shown in Table IV below.

Table IV

| Temperature of densification vessel in ° C. | Th(NO₃)₄ Charge | Size Range in mμ. | Wt. median diameter in mμ | Relative light scattering |
|---|---|---|---|---|
| 92-97 | 1,750 g., 5% ThO₂ | 5-40 | 26 | 17 |
| 92-97 | 3,750 g., 10% ThO₂ | 5-50 | 36 | 49 |
| 110 | 3,750 g., 5% ThO₂ | 5-60 | 43 | 71 |

Examination of the data shows that increasing the temperature of the densification vessel produces a sol with a slightly increased particle size.

EXAMPLE VII

The poor stability of thoria sols of the parent type in the presence of certain ions is demonstrated by the following example.

To portions of deionized thoria sol containing 4.62% $ThO_2$ the following solutions were gradually added:

(a) Dilute NaOH
(b) Dilute NH₄OH
(c) Dilute H₂SO₄
(d) Dilute H₃PO₄
(e) Tap water (pH 8.0)
(f) Dilute HCl
(g) Dilute HNO₃

In cases a–e, the addition resulted in precipitation of hydrous thoria. Addition of HCl and $HNO_3$ did not produce any noticeable change in stability.

EXAMPLE VIII

The disposition of silica on the thoria micelles in the cladding operation is evidenced by the following data obtained on the parent thoria sol of Example I and on the resulting silica-clad (daughter) sample also of Example I.

(A) The parent thoria sol was studied by electrophoretic techniques which showed that the micelles carried a positive electrical charge.

A similar study of the daughter sample showed that the micelles carried a negative electrical charge.

(B) The parent sample, after treatment with silica sol, was in contrast with the behavior of the untreated parent sol, stable even at pH's as high as 10.

(C) The particle size of the daughter sample as pictured in electron micrographs, was definitely larger than that of the parent thoria sol sample.

The following table gives the results of the counts made at stated particle diameters.

Table V

| Dia. of particles D (mμ) | Wt. percent of particles of sol A less than D | Wt. percent of particles of sol B less than D |
|---|---|---|
| 21.5 | 4.5 | 2.8 |
| 31.0 | 14.8 | 6.9 |
| 40.5 | 29.6 | 15.2 |
| 50.0 | 37.9 | 26.9 |
| 55.0 | 50.0 | |
| 59.6 | 56.2 | 33.6 |
| 66.0 | 84.6 | 38.2 |
| 69.2 | 90.3 | 44.8 |
| 75.5 | 100 | 57.8 |
| 78.7 | 100 | 75.2 |
| 81.9 | 100 | 87.0 |
| 85.0 | 100 | 96.0 |
| 94.6 | 100 | 97.4 |
| 97.8 | 100 | 99.9 |

EXAMPLE IX

The increase in size of the particles as a result of the silica sol treatment is indicative of silica build-up on the original thoria micelles. This fact was verified by studying the daughter samples with the aid of the electron microscope using techniques directed towards contrasting areas of different electron opacity. The micrographs obtained clearly showed spherical particles consisting of a very opaque spherical core surrounded by a less opaque layer or halo.

Ultra centrifuge experiments with the daughter sample yielded three sedimentation constants: $1.67 \times 10^{-9}$, $.43 \times 10^{-9}$ and $.30 \times 10^{-9}$ seconds. Using the sedimentation constants, Stokes Equation for centrifugal fields and the electron micrograph distribution count data, micelle densities of the unautoclaved sol were estimated to be $4.5 \pm .8$ gm./cc. This compares with a density of $7 \pm 1$ gm./cc. for the thoria particles.

The amorphous character of the thoria in both the parent and daughter samples was demonstrated by drying portions of each under vacuum at ambient temperature and using the residues obtained for X-ray diffraction studies. In no case was crystallinity observed.

Upon hydrothermally treating the silica-clad sample by heating for 18 hours at 250° C. under non-evaporative conditions, several changes were observed in the resulting sol.

(1) The particle size of the micelles increased from the weight median of 72 mμ to a value of 116 mμ. This was no doubt due to the accretion of small independent silica particles on the silica-clad thoria micelles.

(2) The layer of silica or halo became more clearly defined in contrast electron micrographs.

(3) The amorphous thoria particles became partly crystalline $ThO_2$. This was established by X-ray diffraction studies of the residue obtained by drying under vacuum at ambient temperature the autoclaved silica-clad thoria sol. The X-ray diffraction pattern obtained was that of thorianite (anhydrous $ThO_2$).

(4) No changes were observed in the sign of the electrical charge carried by the micelles.

EXAMPLE X

To demonstrate the necessity for rapid mixing of the thoria and silica sols, 40 cc. of 0.96% $SiO_2$ sol prepared by ion exchange were added slowly and with constant stirring to 100 cc. of 4.7% $ThO_2$ sol prepared by electrodialysis as described in Example I and having a pH of 4.0. The thoria precipitated before all of the silica sol was added and addition of the remainder of the silica sol did not redisperse the thoria.

In a second test using the same quantities and kinds of starting sols, the silica was added rapidly into the thoria sol with agitation. There was no evidence of precipitate formation. The resulting mixed sol was stable on standing and the thoria particles carried by negative electrical charge.

EXAMPLE XI

A sample of our cladded thoria sol was placed in a reactor where it was exposed to a flux of $2.3 \times 10^{13}$ neutrons/cm.² sec. and at a temperature of 200° C. After exposure for 300 hours, the thoria sol exhibited no change in viscosity, indicating stability to neutrons under the conditions obtained in a nuclear reactor.

Obviously many modifications and variations of the invention as hereinabove set forth may be made without departing from the essence and scope thereof and only such limitations should be applied as are indicated in the appended claims.

What is claimed is:

1. The method of preparing a hydrothermally stable metal oxide clad sol of a hydrous oxide selected from the group consisting of thoria, urania, plutonia and mixtures thereof comprising the steps of slowly adding a solution of a soluble salt of a monobasic acid of a metal selected from the group consisting of zirconium and titanium to an aqueous dispersion of the hydrous oxide at a concentration of 5 to 10%, concentrating the resulting product, passing the product through a mixed bed ion exchange resin to remove ions and recovering the metal oxide clad sol.

2. The method of preparing a hydrothermally stable, zirconia-clad sol of a hydrous oxide selected from the group consisting of thoria, urania, plutonia and mixtures thereof comprising the steps of slowly adding a zirconium salt of a monobasic acid solution to an aqueous dispersion of the hydrous oxide at a concentration of 5 to 10%, concentrating the resulting product, passing the product through a mixed bed ion exchange resin to remove the negative ions and recovering the zirconia-clad sol.

3. The method of preparing a hydrothermally stable zirconia-clad thoria sol comprising the steps of slowly adding zirconyl nitrate solution to an aqueous dispersion of thoria at a concentration of 5 to 10%, concentrating the resulting product, passing the product through a mixed bed ion exchange resin to remove nitrate ions and recovering the zirconia-clad sol.

4. The method of preparing a hydrothermally stable zirconia-clad urania sol compresing the steps of slowly adding zirconyl nitrate solution to an aqueous dispersion of urania at a concentration of 5 to 10%, concentrating the resulting product, passing the product through a mixed bed ion exchange resin to remove nitrate ions and recovering the zirconia-clad sol.

5. The method of preparing a hydrothermally stable zirconia-clad plutonita sol comprising the steps of slowly adding zirconyl nitrate solution to an aqueous dispersion of plutonia at a concentration of 5 to 10%, concentrating the resulting product, passing the product through a mixed bed ion exchange resin to remove nitrate ions and recovering the zirconia-clad sol.

References Cited by the Examiner

UNITED STATES PATENTS

| | | | |
|---|---|---|---|
| 2,560,707 | 7/51 | Stark | 252—313 |
| 2,600,370 | 6/52 | Schlesinger et al. | 23—14.5 |
| 2,824,784 | 2/58 | Hansen et al. | 23—14 |
| 2,885,366 | 5/59 | Iler | 252—313 |
| 2,905,528 | 9/59 | Johnson et al. | 23—14.5 |
| 3,002,808 | 10/61 | La Mont | 23—14 |

FOREIGN PATENTS 753,399    7/16    Great Britain.

OTHER REFERENCES

Thomas et al.: JACS, vol. 57, pp. 1821–1825, 1935.
Dobry et al.: J. de chimie pysique, vol. 50, pp. 501–506, 1953.
Lane et al.: "Fluid Fuel Reactors," pp. 128–132, 1958.
AEC Document K–295, Part 2, p. 115, Mar. 1, 1955.

CARL D. QUARFORTH, *Primary Examiner*.
J. GREENWALD, LEON D. ROSDOL, *Examiners*.

UNITED STATES PATENT OFFICE
CERTIFICATE OF CORRECTION

Patent No. 3,164,554　　　　　　　　　　　　　　　January 5, 1965

Wayne T. Barrett et al.

It is hereby certified that error appears in the above numbered patent requiring correction and that the said Letters Patent should read as corrected below.

Column 4, line 2, after "thorough" insert -- mixing --.

Signed and sealed this 4th day of May 1965.

SEAL)
Attest:

ERNEST W. SWIDER
Attesting Officer

EDWARD J. BRENNER
Commissioner of Patents